(12) United States Patent
Takei et al.

(10) Patent No.: US 10,195,949 B2
(45) Date of Patent: Feb. 5, 2019

(54) CHARGER

(71) Applicant: FUJI ELECTRIC CO., LTD., Kawasaki-shi (JP)

(72) Inventors: Osamu Takei, Hino (JP); Akio Toba, Hino (JP); Yasuaki Hachisu, Kobe (JP); Masakazu Gekinozu, Matsumoto (JP); Hiroji Nishida, Hino (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 287 days.

(21) Appl. No.: 15/178,704

(22) Filed: Jun. 10, 2016

(65) Prior Publication Data

US 2016/0280083 A1  Sep. 29, 2016

Related U.S. Application Data

(63) Continuation of application No. PCT/JP2014/064542, filed on May 30, 2014.

(51) Int. Cl.
| | |
|---|---|
| *H02J 7/04* | (2006.01) |
| *H02J 7/00* | (2006.01) |
| *B60L 11/18* | (2006.01) |
| *H02J 7/02* | (2016.01) |
| *B60L 3/00* | (2006.01) |

(52) U.S. Cl.
CPC ......... *B60L 11/1812* (2013.01); *B60L 3/0046* (2013.01); *B60L 3/0069* (2013.01); *B60L 11/1861* (2013.01); *H02J 7/0029* (2013.01); *H02J 7/022* (2013.01)

(58) Field of Classification Search
USPC ....... 320/109, 107, 108, 110, 101, 163, 103, 320/104, 128, 140
See application file for complete search history.

(56) References Cited

U.S. PATENT DOCUMENTS 9,257,897 B2 * 2/2016 Saeck ..................... H02M 1/32
2003/0174522 A1 * 9/2003 Xu ..................... H02M 3/33592
363/22

(Continued)

FOREIGN PATENT DOCUMENTS

| JP | 10-313546 | 11/1998 |
|---|---|---|
| JP | 2008-269860 | 11/2008 |

(Continued)

OTHER PUBLICATIONS

International Search Report dated Aug. 12, 2014, in corresponding International Application No. PCT/JP2014/064542.

(Continued)

*Primary Examiner* — Alexis Pacheco

(57) ABSTRACT

A charger, in one possible configuration, has an AC/DC converter that converts alternating current power supplied from an external alternating current power supply into direct current power and outputs the direct current power, a DC/DC converter that transforms the direct current power output by the AC/DC converter and supplies the transformed direct current power to a vehicle-mounted battery, and a safety control unit that forcibly stops the DC/DC converter with detection of an occurrence of a fault during charging of the vehicle-mounted battery as a trigger, and subsequently causes the AC/DC converter to stop normally.

8 Claims, 4 Drawing Sheets

(56) References Cited

U.S. PATENT DOCUMENTS

| | | | | |
|---|---|---|---|---|
| 2004/0090799 | A1* | 5/2004 | Matsumoto | H02M 3/335 363/16 |
| 2010/0277132 | A1* | 11/2010 | Hara | B60L 11/1864 320/163 |
| 2012/0112684 | A1* | 5/2012 | Xu | B60L 3/0046 320/101 |
| 2013/0193922 | A1* | 8/2013 | Park | B60L 3/00 320/109 |
| 2015/0288201 | A1* | 10/2015 | Hatakeyama | B60L 3/0069 320/107 |

FOREIGN PATENT DOCUMENTS

| | | |
|---|---|---|
| JP | 2013-158240 | 8/2013 |
| JP | 2014-27854 | 2/2014 |

OTHER PUBLICATIONS

"ISO26262", <http://www.jari.or.jp/tabid/112/Default.aspx>, accessed Nov. 11, 2015.

\* cited by examiner

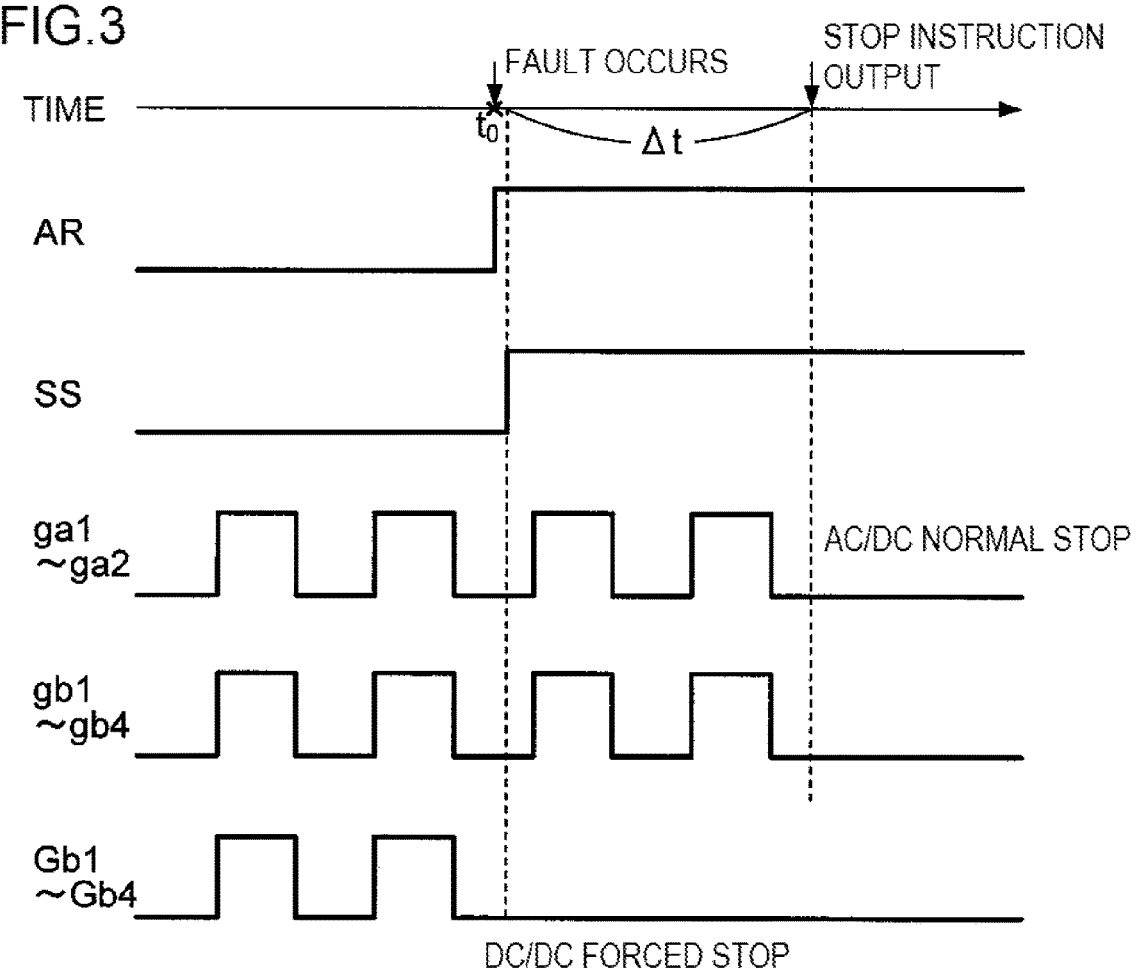

CHARGER

CROSS-REFERENCE TO RELATED APPLICATIONS

This application is a continuation application, filed under 35 U.S.C. § 111(a), of International Application PCT/JP2014/064542 filed on May 30, 2014, the entire contents of which are hereby incorporated by reference.

BACKGROUND

1. Field

The present disclosure relates to a charger that charges a battery, and in particular, relates to a charger that charges a battery of a vehicle that runs with a motor as a power source.

2. Related Art

Examples of this kind of vehicle include an electric vehicle and a hybrid vehicle. A battery of a high voltage dangerous to a human body is mounted as a power supply of a motor in this kind of vehicle, and a vehicle-mounted charger for charging the vehicle-mounted battery also uses high voltage, because of which sufficient consideration needs to be given to safety. ISO26262, officially published in 2011, is included as one automotive functional safety standard (see, for example, www.jari.or.jp/tabid/112/Default.aspx). An object of ISO26262 is to control risk to the extent that it is acceptable. Providing a function that forcibly stops all functions of the vehicle-mounted charger when a fault is detected is specified in ISO26262. This kind of vehicle-mounted charger commonly has such a configuration that an AC/DC converter and a DC/DC converter are connected in series, and it is conceivable that a function that forcibly stops both the AC/DC converter and the DC/DC converter when a fault occurs is provided in the charger.

SUMMARY

In ISO26262, it is sufficient that risk reduction measures are taken at a level corresponding to a target safety integrity level. With respect to this, the configuration such that both the AC/DC converter and the DC/DC converter are forcibly stopped when a fault is detected providing the significant risk reduction effect but leading to an increase in cost, and there may be over-engineering in comparison with the target safety integrity level.

The disclosure, having been contrived in consideration of the heretofore described problem, has an aspect of providing technology that enables risk reduction at a level in accordance with a required target safety integrity level, in a charger that charges a vehicle-mounted battery.

In order to address the heretofore described problem, the disclosure causes the safety control unit of a charger having an AC/DC converter, a DC/DC converter connected in series to the AC/DC converter, and a safety control unit that carries out control for safety when a fault occurs to execute the following process. That is, the safety control unit causes a pre-specified one of the AC/DC converter and the DC/DC converter to stop with priority, with a reception of a fault detection signal that gives notice that a fault has occurred during charging of a vehicle-mounted battery as a trigger.

For example, when a target safety integrity level required of the charger is "to at least avoid breakage of a vehicle-mounted battery even when some fault occurs during charging of the vehicle-mounted battery", it is sufficient that the DC/DC converter is caused to stop with priority. As opposed to this, when "at least avoiding breakage of a charger (more precisely, breakage of a smoothing capacitor included in an AC/DC converter) even when some fault occurs during charging of a vehicle-mounted battery" is required as the target safety integrity level, it is sufficient that the AC/DC converter is stopped with priority.

A vehicle-mounted battery charger configured with an AC/DC converter and a DC/DC converter which are connected in series is generally such that a controller (hereafter, a converter control unit) that carries out control of an operation of the AC/DC converter and the DC/DC converter in accordance with the state of charge of the vehicle-mounted battery is provided separately from a safety control unit that carries out control of an operation of the whole charger. It is sufficient that a mask circuit that interrupts a drive signal output from the converter control unit to a pre-specified one of the AC/DC converter and the DC/DC converter, with a reception of a forced stop instruction signal having an active level from the safety control unit as a trigger, is provided in a charger with this kind of configuration and that the safety control unit is caused to execute a process of applying the forced stop instruction signal having the active level to the mask circuit and applying a stop instruction instructing a stopping of drive signal output to the converter control unit, with a reception of a fault detection signal as a trigger. According to this kind of aspect, the required safety integrity level can be realized at a lower cost than that of an aspect in which a mask circuit is provided for each of the AC/DC converter and the DC/DC converter.

Generally, communication between the safety control unit and the converter control unit is carried out via a serial bus. Therefore, even when the safety control unit is caused to simultaneously carry out an output of the forced stop instruction signal having the active level and an output of the stop instruction, the pre-specified converter can be caused to stop first (that is, caused to stop with temporal priority). In order that the pre-specified converter is safely caused to stop first, the safety control unit may be caused to execute a process of outputting the stop instruction after outputting a forced stop instruction signal.

According to the disclosure, risk reduction at a level in accordance with a required target safety integrity level can be efficiently realized in a charger that charges a vehicle-mounted battery.

BRIEF DESCRIPTION OF THE DRAWINGS

These and/or other aspects and advantages will become apparent and more readily appreciated from the following description of the embodiments, taken in conjunction with the accompanying drawings of which:

FIG. 3 is a timing chart showing an example of an operation of the charger.

DESCRIPTION OF EMBODIMENTS

Hereafter, a description will be given of embodiments of the disclosure.

A: First Embodiment

Figure 1:
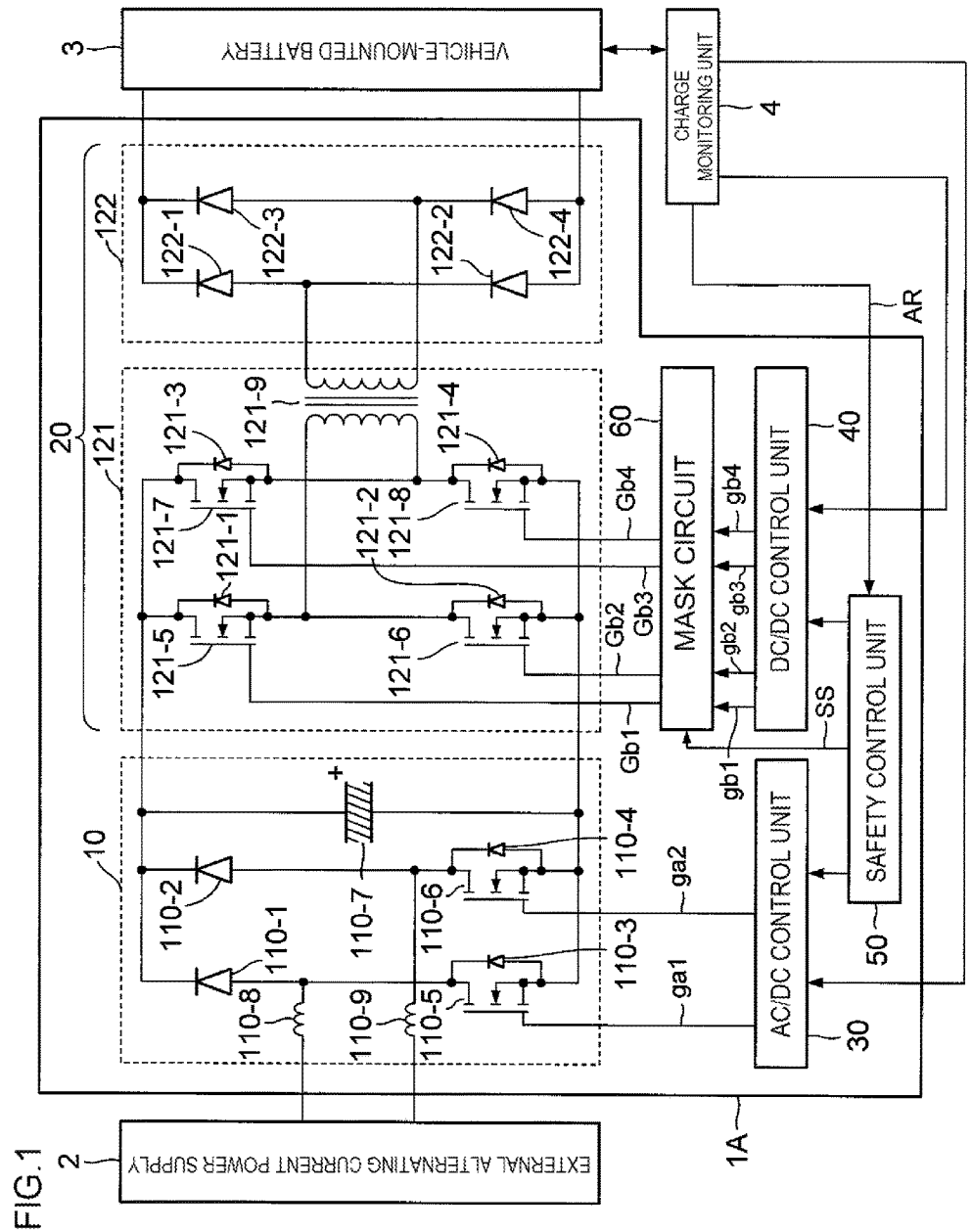
FIG. 1 is a diagram showing a configuration example of a charger of a first embodiment of the disclosure.

FIG. 1 is a diagram showing a configuration example of a charger 1A of a first embodiment of the disclosure.

The charger 1A, being a vehicle-mounted charger mounted in a vehicle having a motor as a power source, such as an electric vehicle or hybrid vehicle, is a device that charges a vehicle-mounted battery 3 that supplies power to the motor. To describe in more detail, the charger 1A is connected via a power cable or the like to an external alternating current power supply 2, which is a household alternating current power supply (that is, a single phase 100V alternating current power supply), and converts alternating current power supplied from the external alternating current power supply 2 into direct current power, thereby charging the vehicle-mounted battery 3. As well as the charger 1A, the vehicle-mounted battery 3 charged by the charger 1A, a charge monitoring unit 4 that monitors the state of charge of the vehicle-mounted battery 3, and the external alternating current power supply 2 are shown in FIG. 1.

The charge monitoring unit 4 is, for example, a BCU (Battery Control Unit). The charge monitoring unit 4 monitors the state of charge (for example, the remaining charge) of the vehicle-mounted battery 3, and provides data expressing a result of the monitoring to the charger 1A via a CAN-BUS. Also, the charge monitoring unit 4 carries out monitoring of the presence or occurrence of a fault (an abnormal rise in voltage between polar plates of a capacitor included in the vehicle-mounted battery 3, a sky fault, a ground fault, or the like) during charging of the vehicle-mounted battery 3. Further, the charge monitoring unit 4 applies a non-active level (for example, low level) fault detection signal AR to the charger 1A while charging of the vehicle-mounted battery 3 is being carried out normally, and switches the level of the fault detection signal AR to an active level (high level) with a detection of an occurrence of some fault (application of an excessively high voltage, or the like) as a trigger. That is, the charge monitoring unit 4 of this embodiment performs the role of fault detection means that monitors the presence or occurrence of a fault during charging of the vehicle-mounted battery 3, and carries out notification to the charger 1A (more precisely, a safety control unit 50 to be described hereafter) when detecting an occurrence of a fault. It is sufficient that existing commonly-known technology is applied as appropriate for monitoring the state of charge of the vehicle-mounted battery 3 and monitoring a fault during charging.

The target safety integrity level of the charger 1A of this embodiment is "to at least avoid breakage of a vehicle-mounted battery even when some fault occurs during charging of the vehicle-mounted battery". The charger 1A of this embodiment is configured so that risk reduction at a level in accordance with this target safety integrity level can be realized at as low of a cost as possible. As shown in FIG. 1, the charger 1A includes an AC/DC converter 10, a DC/DC converter 20, an AC/DC control unit 30, a DC/DC control unit 40, a safety control unit 50, and a mask circuit 60.

The AC/DC converter 10 converts alternating current power supplied from the external alternating current power supply 2 into direct current power, and outputs the direct current power. The AC/DC converter 10 is configured of diodes 110-1 and 110-2, flywheel diodes 110-3 and 110-4, FETs 110-5 and 110-6, a smoothing capacitor 110-7, and reactors 110-8 and 110-9. The reactors 110-8 and 110-9 are provided in order to attenuate high frequency. The diodes 110-1 and 110-2 and FETs 110-5 and 110-6 configure a PFC circuit that rectifies alternating current voltage supplied from the external alternating current power supply 2 and supplies direct current voltage to the smoothing capacitor 110-7. Each of the FETs 110-5 and 110-6 is turned on when an active level drive signal is applied to a gate thereof, and turned off when a non-active level drive signal is applied to the gate.

The smoothing capacitor 110-7 is an electrolytic capacitor provided in order to smooth direct current voltage output from the PFC circuit. The flywheel diodes 110-3 and 110-4 are connected in anti-parallel to the FETs 110-5 and 110-6, and cause a backflow to the input power supply (in this embodiment, the external alternating current power supply 2) side of current generated by electromagnetic energy accumulated in the reactors 110-8 and 110-9 when switching the FETs 110-5 and 110-6 on and off.

The AC/DC control unit 30 is, for example, a CPU (Central Processing Unit), and carries out control of an operation of the AC/DC converter 10 in accordance with the state of charge of the vehicle-mounted battery 3. To describe in more detail, the AC/DC control unit 30 switches the level of drive signals ga1 and ga2 applied to the gates of the FETs 110-5 and 110-6 respectively from an active level (for example, a high level) to a non-active level (for example, a low level), or vice versa, so that a preferred voltage or current in accordance with the state of charge of the vehicle-mounted battery 3 is output from the AC/DC converter 10. Therefore, control of the operation of the AC/DC converter 10 is realized.

The DC/DC converter 20 is connected in series to the AC/DC converter 10. The DC/DC converter 20 is configured of an inverter 121 and a rectifier 122. The inverter 121 is configured of FETs 121-5 to 121-8, flywheel diodes 121-1 to 121-4, and a transformer 121-9. The inverter 121 is a circuit that, with the direct current voltage with which the smoothing capacitor 110-7 of the AC/DC converter 10 is charged as power supply voltage, outputs alternating current voltage to a primary winding of the transformer 121-9 by switching the power supply voltage using the FETs 121-5 to 121-8. Each of the FETs 121-5 to 121-8 too is turned on when an active level drive signal is applied to a gate thereof, and turned off when a non-active level drive signal is applied to the gate.

The transformer 121-9 outputs alternating current voltage in accordance with the alternating current voltage applied to the primary winding to the rectifier 122 from a secondary winding. The rectifier 122 rectifies the alternating current voltage output from the secondary winding of the transformer 121-9 using diodes 122-1 to 122-4, and supplies direct current voltage to the vehicle-mounted battery 3.

Like the AC/DC control unit 30, the DC/DC control unit 40 is a CPU. Hereafter, the AC/DC control unit 30 and DC/DC control unit 40 may be referred to collectively as "the converter control units". The DC/DC control unit 40 outputs drive signals gb1 to gb4 for switching switching elements included in the inverter 121 (in this embodiment, the FETs 121-5 to 121-8) on and off. By the switching cycle of the switching elements being regulated in accordance with the state of charge of the vehicle-mounted battery 3, preferred voltage or current in accordance with the state of charge is supplied from the DC/DC converter 20 to the vehicle-mounted battery 3. As shown in FIG. 1, the drive signals gb1 to gb4 are applied one each via the mask circuit 60 to the switching elements as drive signals Gb1 to Gb4 respectively.

Like the AC/DC control unit 30, the safety control unit 50 is a CPU, and is connected to the AC/DC control unit 30 and the DC/DC control unit 40 via a serial bus (omitted from FIG. 1). The safety control unit 50, with a reception of the active level fault detection signal AR from the charge monitoring unit 4 as a trigger, carries out control for safety. To describe in more detail, the safety control unit 50 outputs a forced stop instruction signal SS having a non-active level to the mask circuit 60 while receiving the non-active level fault detection signal AR from the charge monitoring unit 4. Further, the safety control unit 50 switches the level of the forced stop instruction signal SS to an active level with a reception of the active level fault detection signal AR as a trigger, and subsequently instructs the AC/DC control unit 30 via the serial bus to stop the AC/DC converter 10 and instructs the DC/DC control unit 40 via the serial bus to stop the DC/DC converter 20.

The reason for causing the safety control unit 50 to carry out this kind of safety control is to realize risk reduction at a level in accordance with the previously described target safety integrity level (that is, to at least avoid breakage of a vehicle-mounted battery even when some fault occurs during charging of the vehicle-mounted battery) at as low a cost as possible. The reason risk reduction at a level in accordance with the heretofore described target safety integrity level can be realized by causing the safety control unit 50 to execute this kind of safety control will be described in detail hereafter.

The mask circuit 60 is a circuit that allows the drive signals gb1 to gb4 output by the DC/DC control unit 40 to pass through unchanged as the drive signals Gb1 to Gb4 while receiving the forced stop instruction signal SS having the non-active level, and interrupts the drive signals Gb1 to Gb4 (that is, maintains the drive signals Gb1 to Gb4 at the non-active level) with the forced stop instruction signal SS switching to the active level as a trigger, thereby forcibly stopping the inverter 121. That is, this embodiment is such that when some fault occurs during charging of the vehicle-mounted battery 3, firstly, stopping the DC/DC converter 20 is given temporal priority, after which the AC/DC converter 10 is stopped.

Figure 2A:
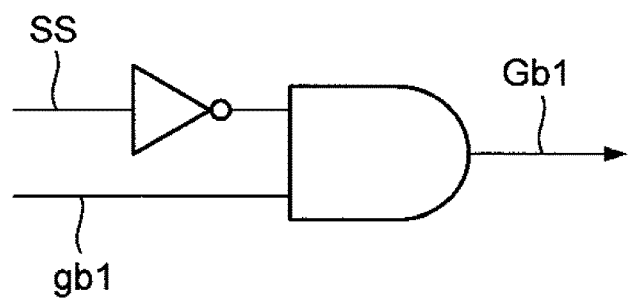
FIGS. 2A and 2B are diagrams showing configuration examples of a mask circuit included in the charger.

Various configurations are conceivable as a specific configuration of the mask circuit 60. For example, as shown in FIG. 2A, an aspect such that the mask circuit 60 is configured with AND gates provided one each for the multiple switching elements included in the inverter 121 is conceivable. Only a configuration corresponding to the FET 121-5, of the four FETs included in the inverter 121, is shown in FIG. 2A. As shown in FIG. 2A, a signal that is the forced stop instruction signal SS logically inverted by an inverter is applied to one input terminal of the AND gate, and the drive signal output from the DC/DC control unit 40 in order to control turning on and off of the switching element corresponding to the AND gate is applied to the other input terminal. Therefore, the drive signal gb1 output from the DC/DC control unit 40 passes through the AND gate while the forced stop instruction signal SS having the non-active level is being output from the safety control unit 50, and is applied to the gate of the FET 121-5 as the drive signal Gb1. Further, when the forced stop instruction signal SS switches from the non-active level to the active level, the drive signal gb1 output from the DC/DC control unit 40 is interrupted in the mask circuit 60, and the drive signal Gb1 is maintained at the low level. Therefore, the FET 121-5 is maintained in an off-state. The same applies to the FETs 121-6 to 121-8. When all the FETs 121-5 to 121-8 are maintained in the off state, the inverter 121 stops.

Figure 2B:
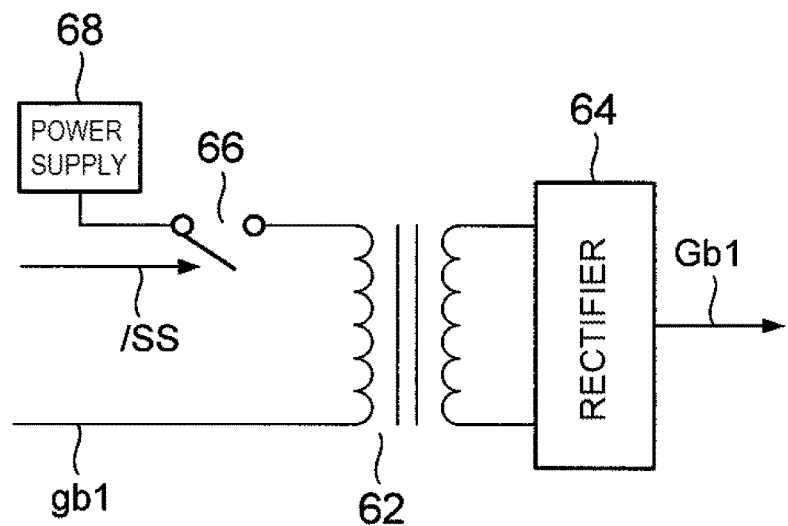

An aspect in which the mask circuit 60 is configured of a pulse transformer 62, rectifier 64, and switching element 66 corresponding to each switching element included in the inverter 121, and a power supply 68 that supplies power to a primary side of the pulse transformer 62 via the switching element 66, is conceivable as another configuration example of the mask circuit 60. In the same way as in FIG. 2A, only a configuration corresponding to the FET 121-5 is shown in FIG. 2B. The drive signal gb1 output by the DC/DC control unit 40 is applied to one end of a primary winding of the pulse transformer 62, while the other end is connected via the switching element 66 to the power supply 68. The switching element 66 is switched on and off by a signal that is the forced stop instruction signal SS logically inverted (a signal indicated by the reference code /SS in FIG. 2B). That is, the switching element 66 is in an on-state when the forced stop instruction signal SS is at the non-active level, and conversely, the switching element 66 is in an off-state when the forced stop instruction signal SS is at the active level.

When the switching element 66 is in the on-state, voltage generated in a secondary winding of the pulse transformer 62 in accordance with the drive signal gb1 output by the DC/DC control unit 40 is rectified by the rectifier 64, and applied to the FET 121-5 as the drive signal Gb1 that switches the FET 121-5 on and off. As opposed to this, when the switching element 66 is in the off-state, the supply of power to the primary side of the pulse transformer 62 is interrupted, whereby the drive signal Gb1 is also interrupted. In the case of the mask circuit 60 having the configuration that an AND gate is used, as shown in FIG. 2A, there is concern that the supply of the drive signals Gb1 to Gb4 to the inverter 121 cannot be interrupted when the AND gate breaks. As opposed to this, by employing the mask circuit 60 having the configuration that a pulse transformer is used, as shown in FIG. 2B, the supply of the drive signals Gb1 to Gb4 to the inverter 121 can be safely interrupted, and the DC/DC converter 20 can be safely forcibly stopped.

FIG. 3 is a timing chart showing an example of an operation of the charger 1A. As shown in FIG. 3, when some fault occurs at a time t0 during charging of the vehicle-mounted battery 3, the occurrence of the fault is detected by the charge monitoring unit 4, and the charge monitoring unit 4 switches the fault detection signal AR from the non-active level to the active level. When the fault detection signal AR switches from the non-active level to the active level, the safety control unit 50 firstly switches the forced stop instruction signal SS from the non-active level to the active level, and subsequently (for example, Δt later), the safety control unit 50 applies a stop instruction to the AC/DC control unit 30 and DC/DC control unit 40. As shown in FIG. 3, the AC/DC control unit 30 and DC/DC control unit 40 continue to output the drive signals until the time Δt elapses from the time t0, but when the forced stop instruction signal SS switches from the non-active level to the active level, the drive signals gb1 to gb4 are interrupted by the mask circuit 60, because of which the DC/DC converter 20 stops immediately, and the AC/DC converter 10 stops the time Δt later.

In this way, as the safety control unit 50 gives priority to stopping the DC/DC converter 20 when some fault occurs during charging of the vehicle-mounted battery 3, overcurrent and the like of the vehicle-mounted battery 3 can be safely avoided, and breakage of the vehicle-mounted battery 3 can be safely avoided. Naturally, when this kind of control is carried out, an excessively high voltage is applied to the smoothing capacitor 110-7 included in the AC/DC converter 10, and it may be that breakage of the smoothing capacitor 110-7 is inescapable. Therefore, it is preferable that a housing of the charger 1A is configured robustly in order that, even assuming provisionally that breakage of the smoothing capacitor 110-7 occurs, the effect thereof does not extend to the periphery.

It goes without saying that by providing a mask circuit for each of the AC/DC converter and the DC/DC converter (that is, by configuring so that the AC/DC converter and the DC/DC converter are simultaneously forcibly stopped when a fault occurs), breakage of the vehicle-mounted battery 3 can be avoided while avoiding breakage of the smoothing capacitor 100-7. However, with this kind of configuration, there is over-engineering with respect to the target safety integrity level required for the charger 1A, and the cost rises in comparison with that of the charger 1A by the cost of providing a mask circuit for the AC/DC converter. That is, according to the charger 1A of this embodiment, risk reduction at a level in accordance with the target safety integrity level of "at least avoiding breakage of a vehicle-mounted battery even when some fault occurs during charging" can be realized at a low cost.

B: Second Embodiment

In the first embodiment, in order to realize risk reduction in accordance with the target safety integrity level of "at least avoiding breakage of a vehicle-mounted battery even when some fault occurs during charging" at a low cost, stopping the DC/DC converter 20 is given priority over stopping the AC/DC converter 10 when a fault occurs during charging of the vehicle-mounted battery 3. However, when protection of the smoothing capacitor 110-7 of the AC/DC converter 10 is given priority over protection of the vehicle-mounted battery 3, that is, when the required target safety integrity level is "at least avoiding breakage of a charger (more precisely, breakage of a smoothing capacitor included in an AC/DC converter) even when some fault occurs during charging", it is sufficient that stopping the AC/DC converter 10 is given priority over stopping the DC/DC converter 20. Specifically, it is sufficient that a charger 1B shown in FIG. 4 is used instead of the charger 1A shown in FIG. 1.

A configuration of the charger 1B differs from the configuration of the charger 1A in that the charger 1B has a voltage monitoring unit 70, the drive signals ga1 and ga2 output by the AC/DC control unit 30 are applied via the mask circuit 60 to the AC/DC converter 10 as drive signals Ga1 and Ga2, and the safety control unit 50 is caused to output the forced stop instruction signal SS having the active level with a fault detection signal AR output by the voltage monitoring unit 70 switching to the active level as a trigger. A configuration that the drive signal gb1 in FIG. 2A or FIG. 2B is replaced with the drive signal ga1 and the drive signal Gb1 is replaced with the drive signal Ga1 is conceivable as a configuration of the mask circuit 60 in FIG. 4.

Figure 4:
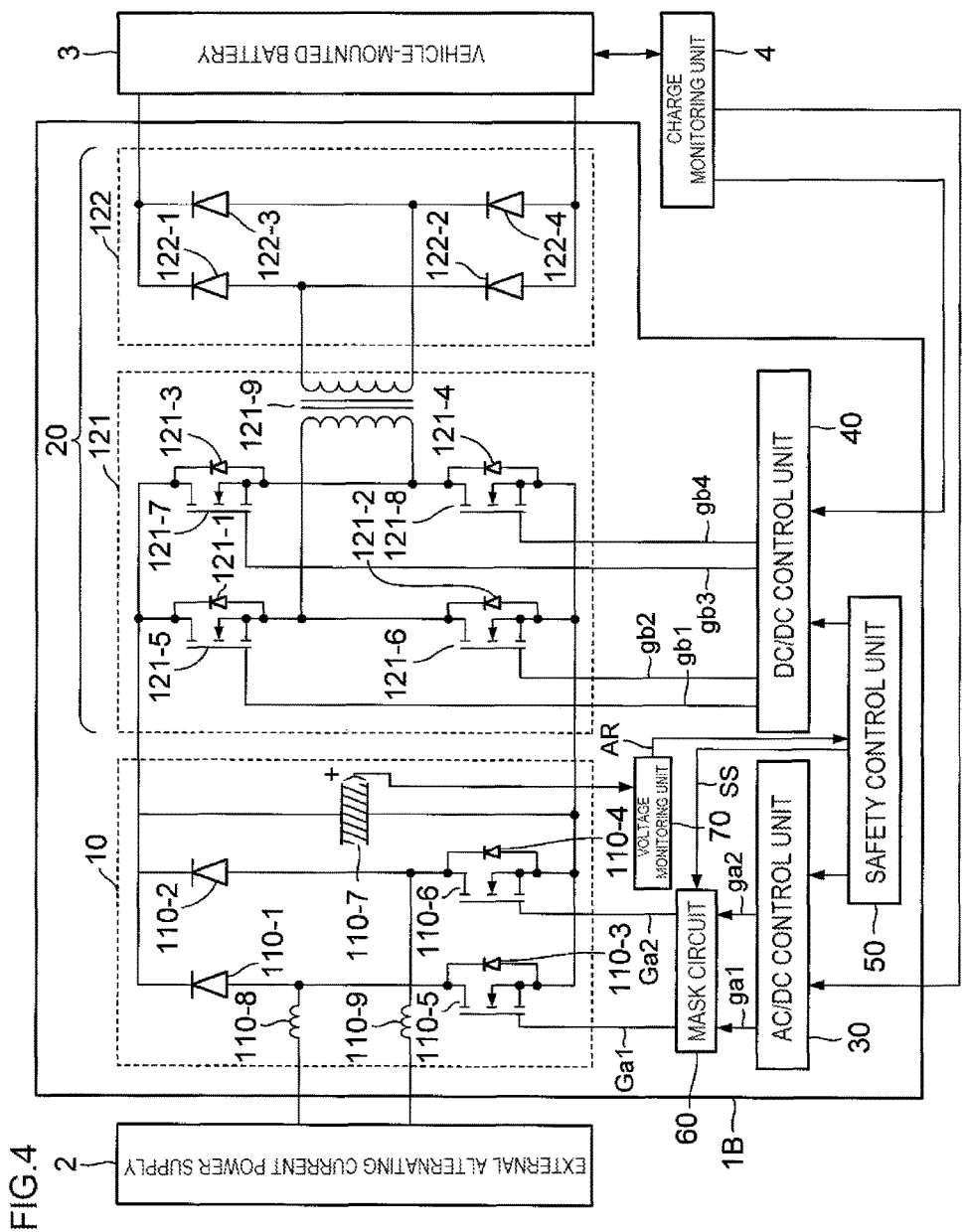
FIG. 4 is a diagram showing a configuration example of a charger of a second embodiment of the disclosure.

The voltage monitoring unit 70 includes a voltage sensor that measures voltage between polar plates of the smoothing capacitor 110-7, a comparator that compares output voltage of the voltage sensor with a predetermined threshold voltage, and a constant voltage generating circuit that generates the threshold voltage and applies the threshold voltage to the comparator (all omitted from FIG. 4). For example, the comparator outputs a low level signal when the output voltage of the voltage sensor is lower than the threshold voltage, and conversely, the comparator outputs a high level signal when the output voltage of the voltage sensor is equal to or higher than the threshold voltage. An output signal of the comparator is applied to the safety control unit 50 as the fault detection signal AR. That is, the voltage monitoring unit 70 performs the role of fault detection means that monitors the presence or otherwise of an occurrence of a fault during charging of the vehicle-mounted battery 3, and carries out notification to the safety control unit 50 when detecting an occurrence of a fault. It is sufficient that the threshold voltage is specified in accordance with the breakdown voltage of the smoothing capacitor 110-7.

According to this embodiment, the AC/DC converter 10 is stopped with priority when an fault such that the voltage between the polar plates of the smoothing capacitor 110-7 reaches the threshold voltage occurs during charging of the vehicle-mounted battery 3, whereby breakage of the smoothing capacitor 110-7 can safely be avoided. In this case, while the smoothing capacitor 110-7 of the AC/DC converter 10 can safely be protected, there is concern that breakage of the vehicle-mounted battery 3 will be caused as stopping of the DC/DC converter 20 is delayed. However, it can be supposed that replacement of the vehicle-mounted battery 3 can be carried out more easily and at a lower cost than replacement of the whole charger. Consequently, employing this embodiment is preferable when, in view of cost and the like, protecting the whole charger is given priority over protecting the vehicle-mounted battery 3. According to this embodiment too, risk reduction at a level in accordance with the required target safety integrity level can be realized at a lower cost than that of the aspect in which both the AC/DC converter and the DC/DC converter are forcibly stopped.

C: Modifications

Heretofore, a description has been given of first and second embodiments of the disclosure, but these embodiments may be modified as follows.

(1) In each of the heretofore described embodiments, the mask circuit 60 for forcibly stopping one of the AC/DC converter 10 and the DC/DC converter 20 is provided, and after the one converter is forcibly stopped by the mask circuit 60, the other converter is forcibly stopped via the AC/DC control unit 30 (or DC/DC control unit 40). That is, in each of the heretofore described embodiments, one of the AC/DC converter 10 and the DC/DC converter 20 is stopped with priority in terms of both hardware configuration and time. However, exchange of data between the safety control unit 50 and the AC/DC control unit 30 (or DC/DC control unit 40) is carried out via a serial bus, because of which, even when a stop instruction is applied to the AC/DC control unit 30 (or DC/DC control unit 40) simultaneously with the forced stop instruction signal switching from the non-active level to the active level, the forced stop process instigated by the latter is executed first. Therefore, the safety control unit 50 may be caused to simultaneously execute switching of the forced stop instruction signal from the non-active level to the active level and applying of a stop instruction to the AC/DC control unit 30 (or DC/DC control unit 40).

Also, the mask circuit 60 may be omitted, and the one of the AC/DC converter 10 and the DC/DC converter 20 which is specified to be stopped with priority may also be stopped via the AC/DC control unit 30 (or DC/DC control unit 40). This is because this kind of aspect is also such that the pre-specified one of the AC/DC converter 10 and the DC/DC converter 20 can be stopped with temporal priority by, after applying a stop instruction to one of the AC/DC control unit 30 and DC/DC control unit 40 (that is, the converter control unit that carries out control of the operation of the one of the AC/DC converter 10 and the DC/DC converter 20 to be stopped with priority), applying a stop instruction to the converter control unit that carries out control of the operation of the other converter.

(2) In the heretofore described first and second embodiments, the DC/DC control unit 40 that carries out control of the operation of the DC/DC converter 20 is provided separately from the AC/DC control unit 30 that carries out control of the operation of the AC/DC converter 10. However, one CPU that combines the role of carrying out control of the operation of the AC/DC converter 10 and the role of carrying out control of the operation of the DC/DC converter 20 may be adopted as a converter control unit, and provided instead of the AC/DC control unit 30 and DC/DC control unit 40. Also, a safety control unit may be caused to include the role of a converter control unit. That is, it is sufficient to provide a vehicle-mounted charger in which are combined an AC/DC converter that converts alternating current power supplied from an external alternating current power supply into direct current power and outputs the direct current power, a DC/DC converter that transforms the direct current power output by the AC/DC converter and supplies the transformed direct current power to the vehicle-mounted battery 3, and a safety control unit that carries out control of the operation of the AC/DC converter and the DC/DC converter in accordance with the state of charge of the vehicle-mounted battery, firstly stops pre-specified one of the AC/DC converter and the DC/DC converter with a reception of the fault detection signal AR that gives notice that a fault has occurred during charging of the vehicle-mounted battery 3 as a trigger, and subsequently causes the other converter to stop (that is, causes the pre-specified converter to be stopped with priority).

(3) In each of the heretofore described embodiments, a description has been given of an example in which the disclosure is applied to a vehicle-mounted charger, but the disclosure may of course also be applied to a charger installed in a charging station. This is because, even in the case of a charger installed in a charging station, there is still a demand for protection of the vehicle-mounted battery and smoothing capacitor when a fault occurs during charging, and it is still preferable that risk reduction at a level in accordance with the target safety integrity level can be realized at low cost.

Any identification in this disclosure of problems, deficiencies, or other characterizations of any product or method of the related art does not imply or admit that such problems, deficiencies, or other characterizations were known in the prior art even if the product or method itself was known in the prior art.

Although a few embodiments have been shown and described, it would be appreciated by those skilled in the art that changes may be made in these embodiments without departing from the principles and spirit of the disclosure, the scope of which is defined in the claims and their equivalents.

REFERENCE SIGNS AND NUMERALS ARE AS FOLLOWS 1A, 1B Charger
2 External alternating current power supply
3 Vehicle-mounted battery
4 Charge monitoring unit
10 AC/DC converter
20 DC/DC converter
30 AC/DC control unit
40 DC/DC control unit
50 Safety control unit
60 Mask circuit
70 Voltage monitoring unit.

What is claimed is:

1. A charger comprising:
an AC/DC converter configured to convert alternating current power supplied from an external alternating current power supply into direct current power and output the direct current power;
a DC/DC converter configured to transform the direct current power output by the AC/DC converter and supply the transformed direct current power to a vehicle-mounted battery;
a converter controller configured to drive the AC/DC converter and the DC/DC converter; and
a safety controller configured to, in response to reception of a fault detection signal indicating that occurrence of a fault has occurred during charging of the vehicle-mounted battery, stop a pre-specified one of the AC/DC converter and the DC/DC converter with priority over the other of the converters such that after the pre-specified one of the AC/DC converter and the DC/DC converter is stopped by the safety controller, the other of the converters continues to be driven by the converter controller for a duration until the converter controller stops outputting a drive signal to the other of the converters.

2. The charger according to claim 1, wherein
the converter controller is configured to output a first drive signal and a second drive signal to drive the AC/DC converter and the DC/DC converter, respectively, in accordance with a state of charge of the vehicle-mounted battery,
the charger further comprises a mask circuit configured to
allow the first drive signal output from the converter controller to pass through to the pre-specified one of the AC/DC converter and the DC/DC converter, when receiving a forced stop instruction signal having a non-active level from the safety controller, and
interrupt the first drive signal in response to reception of the forced stop instruction signal having an active level, and
the safety controller, in response to reception of the fault detection signal,
stops the pre-specified one of the AC/DC converter and the DC/DC converter by switching the forced stop instruction signal applied to the mask circuit from the non-active level to the active level, and
applies a stop instruction instructing the converter controller to stop outputting the second drive signal.

3. The charger according to claim 2, wherein the safety controller applies the stop instruction to the converter controller after switching the forced stop instruction signal from the non-active level to the active level.

4. The charger according to claim 2, wherein the mask circuit comprises:
a switch driven based on the forced stop instruction signal;
a pulse transformer having a primary winding and a secondary winding, one end of the primary winding connected to a power supply via the switch, and another end of the primary winding receiving the first drive signal; and
a rectifier configured to rectify voltage generated in the secondary winding of the pulse transformer.

5. The charger according to claim 1, wherein the converter controller comprises:
a AC/DC converter controller configured to output a first drive signal to drive the AC/DC converter; and
a DC/DC converter controller configured to output a second drive signal to drive the DC/DC converter.

6. The charger according to claim 5, wherein
the pre-specified one of the AC/DC converter and the DC/DC converter is the AC/DC converter,
the charger further comprises a mask circuit configured to allow the first drive signal output from the AC/DC converter controller to pass through to the AC/DC converter, when receiving a forced stop instruction signal having a non-active level from the safety controller, and interrupt the first drive signal in response to reception of the forced stop instruction signal having an active level, and the safety controller, in response to reception of the fault detection signal, stops the AC/DC converter by switching the forced stop instruction signal applied to the mask circuit from the non-active level to the active level, and afterwards, instructs the DC/DC converter to stop outputting the second drive signal.

7. The charger according to claim 5, wherein
the pre-specified one of the AC/DC converter and the DC/DC converter is the DC/DC converter,
the charger further comprises a mask circuit configured to
allow the second drive signal output from the DC/DC converter controller to pass through to the DC/DC converter, when receiving a forced stop instruction signal having a non-active level from the safety controller, and interrupt the second drive signal in response to reception of the forced stop instruction signal having an active level, and the safety controller, in response to reception of the fault detection signal, stops the DC/DC converter by switching the forced stop instruction signal applied to the mask circuit from the non-active level to the active level, and afterwards, instructs the AC/DC converter to stop outputting the first drive signal.

8. The charger according to claim 2, wherein
after the pre-specified one of the AC/DC converter and the DC/DC converter is stopped by the safety controller, the other of the converters continues to receive the second drive signal from the converter controller, so as to be driven by the converter controller, until the stop instruction causes the converter controller to stop outputting the second drive signal.

* * * * *